C. E. HYLANDER.
STEAM AND LIQUID SEPARATOR.
APPLICATION FILED JUNE 7, 1909.
934,727.
Patented Sept. 21, 1909.
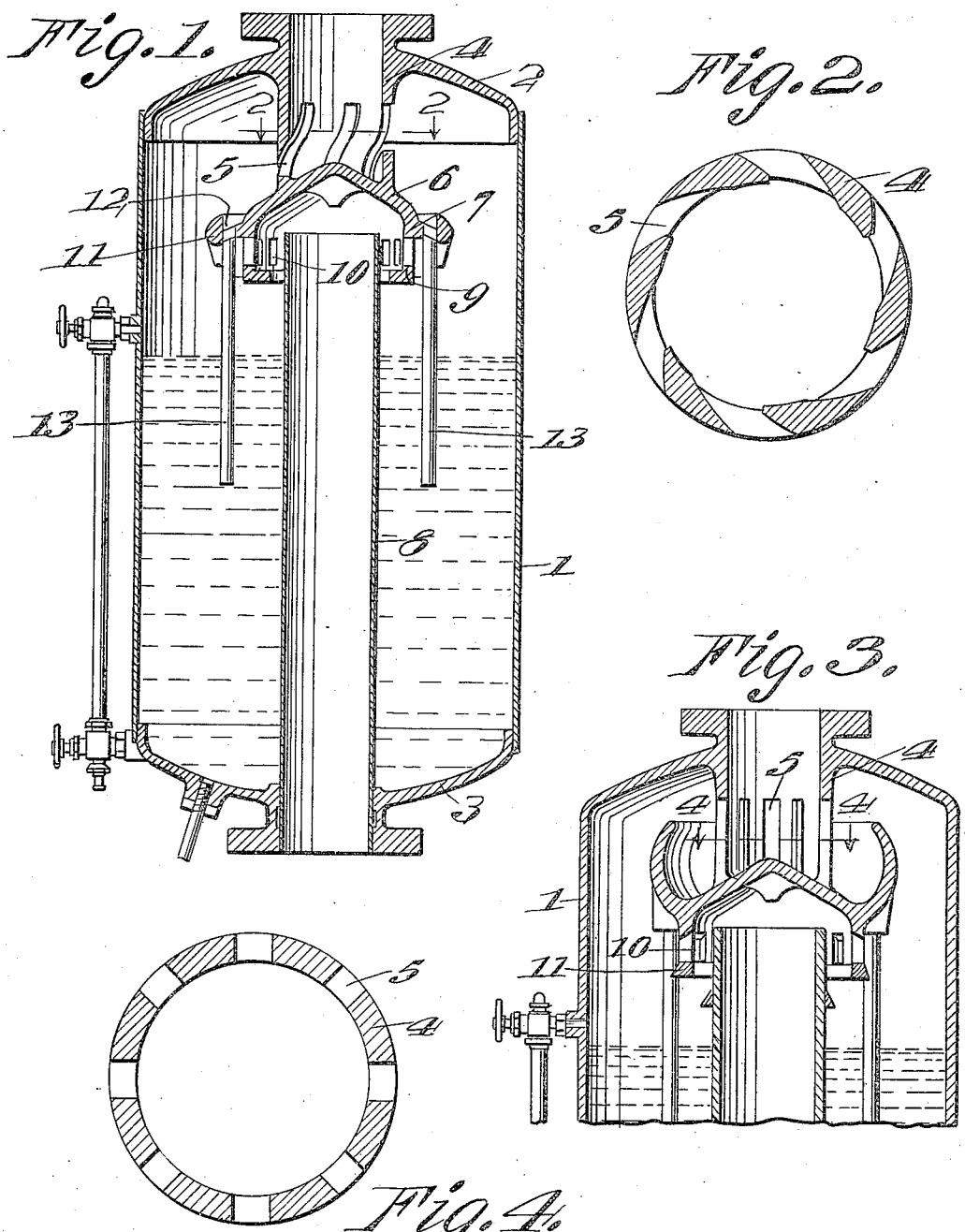

UNITED STATES PATENT OFFICE.

CHARLES E. HYLANDER, OF PITTSBURG, PENNSYLVANIA.

STEAM AND LIQUID SEPARATOR.

934,727.

Specification of Letters Patent. Patented Sept. 21, 1909.

Application filed June 7, 1909. Serial No. 500,598.

*To all whom it may concern:*

Be it known that I, CHARLES E. HYLANDER, a subject of the Emperor of Germany, residing at Pittsburg, in the county of Allegheny and State of Pennsylvania, have invented certain new and useful Improvements in Steam and Liquid Separators; and I do declare the following to be a full, clear, and exact description of the invention, such as will enable others skilled in the art to which it appertains to make and use the same.

This invention relates to a separator for separating either oil or water from steam and has for its object to provide a simple and economical device of this kind which will cause the separation of the oil or water and steam with great efficiency.

With this and other objects in view, the invention consists of certain novel features of construction, combination and arrangement of parts as will be more fully described and particularly pointed out in the appended claims.

In the accompanying drawings, Figure 1 is a vertical longitudinal section of a steam and oil separator embodying my improvements; Fig. 2 is a horizontal section taken on line 2—2 of Fig. 1; Fig. 3 is a transverse section of a modified form of the oil and steam separating device; and Fig. 4 is a horizontal section taken on line 4—4 of Fig. 3.

Referring to the drawings for a more particular description of the invention, the separator comprises a cylindrical casing 1, a removable cover 2, and the removable bottom 3. The cover 2, is provided with a central tubular depending stem or portion 4, which forms the separator inlet, the lower projecting end of said stem or portion being formed with a series of longitudinal spiral slots or openings 5, through which the oil or water and steam passes against the inside surface of the upper end of the casing 1. Said upper end of the casing may be baffled inside to secure the best separation of steam and liquid substances. The lower end of the stem or portion 4, of the cover is integral with the cone-shaped top or upper surface 6, of the cylindrical hood or liquid deflector 7, which incloses the upper end of the steam pipe 8, which extends through the bottom 3, of the separator. The deflector 7, is provided with the cylindrical body 9, provided with a series of vertical circumferentially spaced slots 10, provided with the outwardly inclined baffle projections 11. The body 9 of the hood or deflector is also provided with an annular trough or cup 12, with which communicates the upper ends of the drain pipes 13, which project downwardly into the casing 1, on opposite sides of the steam pipe 8.

If desired, the trough or cup 12, may be of the form shown in Fig. 3 while the slots 5 in the stem or portion 4, may be straight or parallel with the longitudinal axis thereof.

In the operation of the device, the steam and water and oil is admitted into the separator through the openings 5, and is subdivided into a number of expanding spiral streams and projected against the inner wall of the casing 1.

The steam passes through the openings 10 in the body of the oil deflector or hood into the upper inlet end of the steam pipe 8, the baffle projections 11 preventing any liquid passing through said slots or openings 10. The oil or water which is collected or caught by the annular trough or cup 12, passes through the drain pipes 13, and collects in the casing 1, and the rest flows down the inside wall of the casing or drips from the baffles 11. These principles and new features can be applied to a vertical separator as shown in the drawings or to a horizontal separator. Part 3 can be the inlet and the upper part 4 the outlet of the separator.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention.

Having thus described my invention what I claim is:—

1. A steam and oil separator comprising an outer casing, a steam pipe extending through one end thereof, a cylindrical hood surrounding the inlet end of said steam pipe and provided with a series of circumferentially spaced steam and liquid inlet openings provided with outwardly projecting baffle projections, said hood being also provided with an annular trough or cup around its body, a plurality of drain pipes communicating with said trough or cup and extending toward the outlet end of the casing, and an inlet tube or stem formed integral with the top of the hood and provided with a series of longitudinal spiral outlet slots or openings.

2. A steam and oil separator comprising an outer casing, a steam pipe extending through one end thereof, a cylindrical hood surrounding the inlet end of the steam pipe and provided with an imperforate or closed cone-shaped top and a series of circumferentially spaced steam and liquid inlet openings having outwardly projecting baffle projections, said hood also having an annular trough or oil or water cup surrounding its body, and an inlet tube formed integral with the top of the hood and provided in its inner portion with a series of spirally disposed circumferentially spaced openings.

3. A steam and oil separator comprising an outer casing a cover, a steam pipe extending through one end thereof, a cylindrical hood surrounding one end of said steam pipe and provided with a series of spaced steam and liquid openings having outwardly projecting baffle projections, said hood also having an annular trough or liquid cup surrounding its body, and an inlet tube formed integral with the hood and cover and provided with a series of spirally disposed circumferentially spaced inlet openings, the parts being so arranged that the separator may be of either vertical or horizontal design or either end of the separator used as the steam inlet or outlet.

In testimony whereof I have hereunto set my hand in presence of two subscribing witnesses.

CHARLES E. HYLANDER.

Witnesses:
  WM. J. LETZKUS,
  JONATHAN DEER.